United States Patent [19]

Blomqvist

[11] 4,128,227

[45] Dec. 5, 1978

[54] SERVO-CONTROLLED VALVE

[75] Inventor: Inge. S. Blomqvist, Sunne, Sweden

[73] Assignee: Sunnex Equipment AB, Sunne, Sweden

[21] Appl. No.: 777,788

[22] Filed: Mar. 15, 1977

[30] Foreign Application Priority Data

Mar. 19, 1976 [SE] Sweden .............................. 7603418

[51] Int. Cl.² ............................................ F16K 7/12
[52] U.S. Cl. ..................................... 251/42; 251/44; 251/285; 251/331
[58] Field of Search ............... 251/45, 46, 331, 335 A, 251/42, 285

[56] References Cited

U.S. PATENT DOCUMENTS

| 2,629,576 | 2/1953 | Rudolph | 251/335 A |
| 3,633,874 | 1/1972 | Veugelers | 251/331 X |
| 4,013,091 | 3/1977 | Hudson | 251/46 X |
| 4,044,998 | 8/1977 | Giese | 251/333 |

FOREIGN PATENT DOCUMENTS

| 675545 | 12/1963 | Canada | 251/335 A |
| 576225 | 5/1933 | Fed. Rep. of Germany | 251/45 |
| 837066 | 6/1960 | United Kingdom | 251/46 |

*Primary Examiner*—Arnold Rosenthal
*Attorney, Agent, or Firm*—Cushman, Darby & Cushman

[57] ABSTRACT

A servo-controlled valve is described, in which a circular flexible diaphragm is inserted in a cylindrical chamber wherein the pressure can be varied in order to move the center part of the diaphragm towards and away from a valve seat. The diaphragm is loosely inserted in the chamber and has a peripheral flange fitting to the cylindrical wall of the chamber. The chamber is closed by a closure member which, when removed, allows the introduction of the diaphragm into the pressure chamber. The closure member is by means of threads screwed onto a sleeve-like projection upon the valve housing wider than the diaphragm. A central inward projection upon the closure member forms a stop delimiting the opening motion of the diaphragm. Said stop is displaceable by manually turning the closure member. A valve and a push button both situated centrally in the closure member control the pressure of the chamber.

12 Claims, 10 Drawing Figures

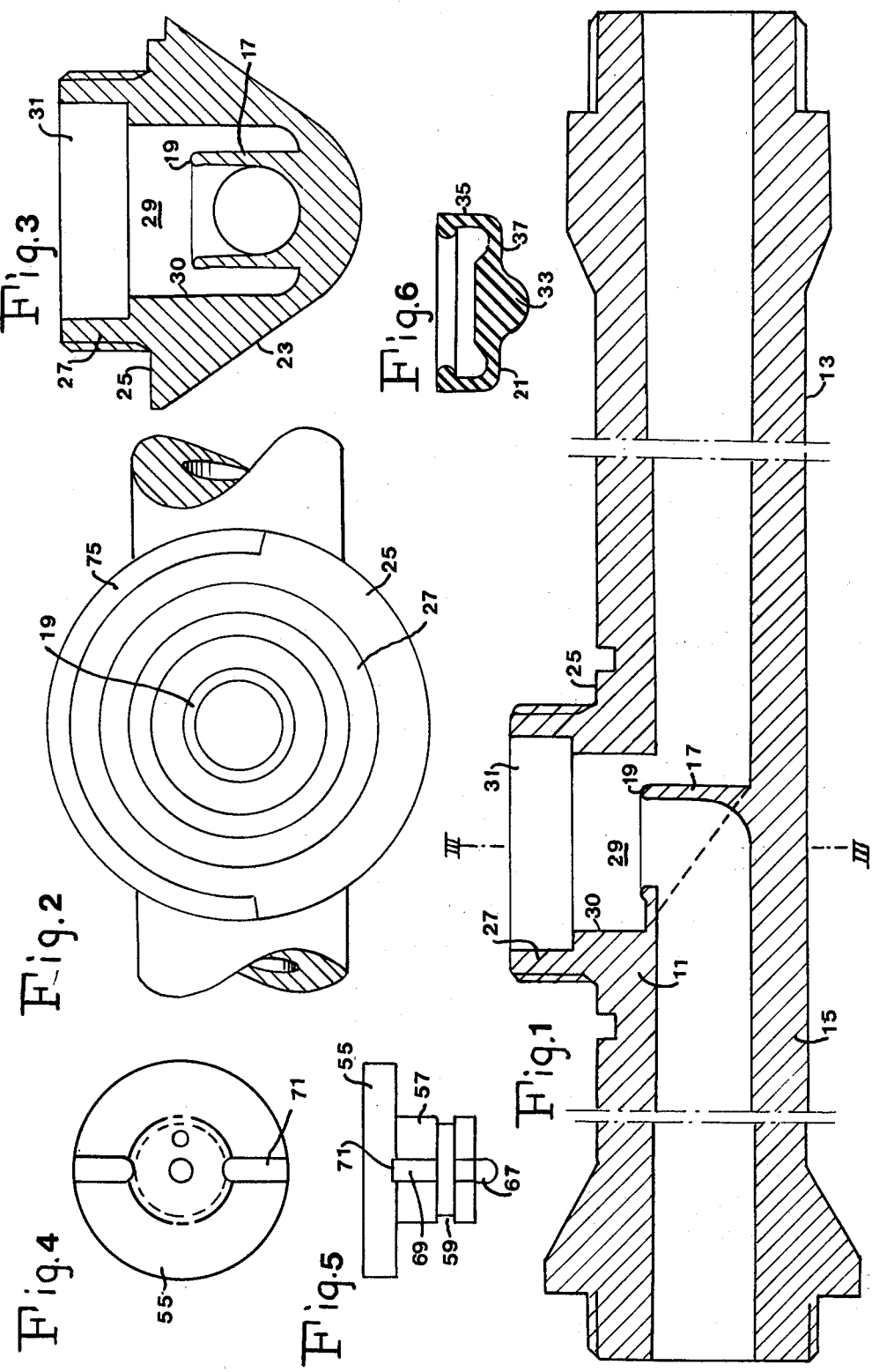

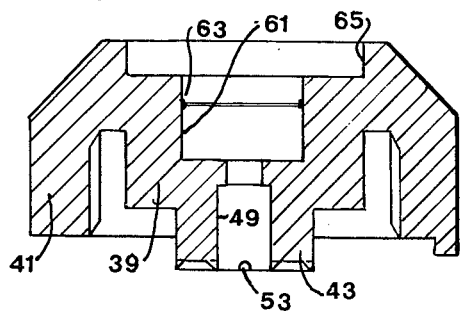
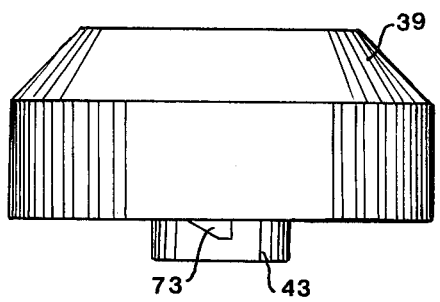
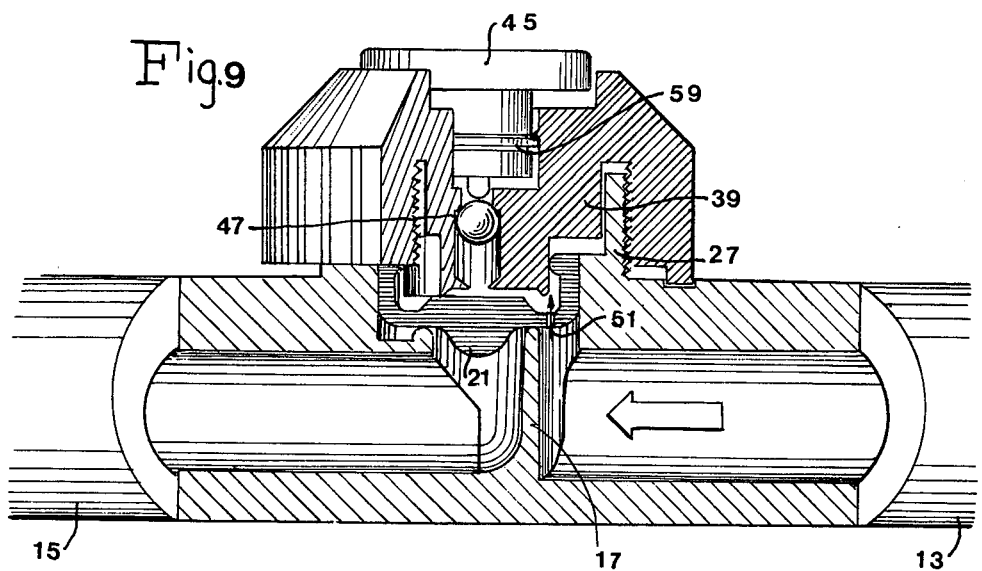
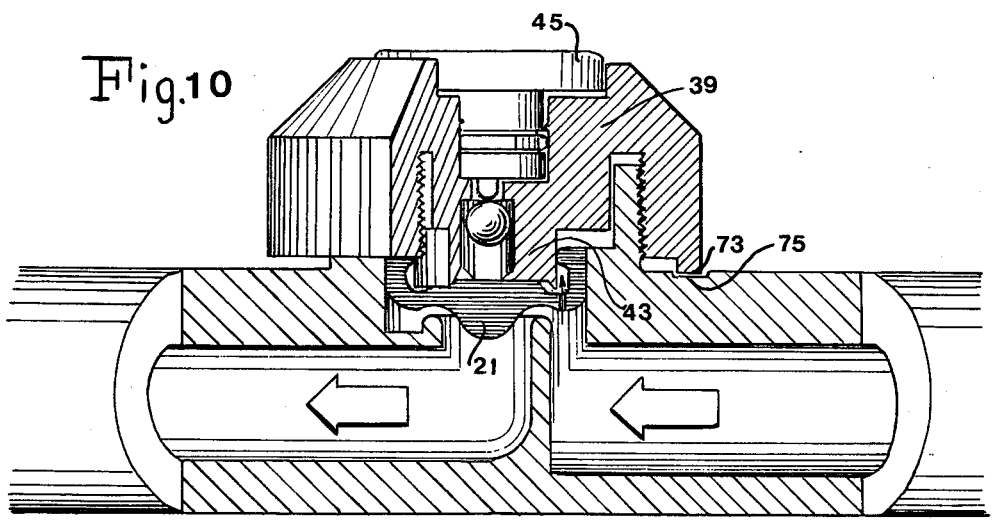

SERVO-CONTROLLED VALVE

The invention relates to a servo-controlled valve of the known kind in which a centre part of a circular flexible diaphragm inserted in a pressure controlled chamber in a valve housing is moveable towards and away from a valve seat for controlling the flow through the valve.

The object of the invention is, in a valve of the kind mentioned to create a design which is easy to manufacture and to overhaul and in which the flow can be set to a desired and adjustable value. Another object is to create a valve which is easy to handle, so that it is possible by one and the same hand and without letting loose the valve to admit and interrupt the flow of pressurized fluid therethrough as well as to control the rate of flow.

Said first object is reached by providing said chamber with a wide opening through which the diaphragm can be inserted when assembling the valve and possibly extracted for replacement, said opening normally being closed by a closure member having screw threads, such as a screw cap or screw plug, said member also forming an adjustable abutment for the centre part of the diaphragm in its flow admitting position.

The invention will be more closely described hereinbelow with reference to the accompanying drawings, in which FIGS. 1 to 8 separately show some of the parts making up the valve, and FIGS. 9 and 10 show the assembled valve in two different working positions. FIG. 1 is a longitudinal sectional view of the valve housing, FIG. 2 is a top plan view thereof, and FIG. 3 is a transverse sectional view thereof taken along the line III — III in FIG. 1. FIGS. 4 and 5 show the push button from below and from the side, respectively. FIG. 6 is an axial sectional view of the diaphragm. FIGS. 7 and 8 are an axial sectional view and a side elevational view, respectively, of the closure member. FIGS. 9 and 10 show the assembled valve with the diaphragm main valve in the closed and open positions, respectively, and the pilot valve 47 in the closed and open positions, respectively.

The valve of the invention can be used for any fluid, but the embodiment shown is primarily intended for periodically admitting pressurized air to an outlet nozzle, and to this end it is so designed that the valve can be readjusted by the same hand as is used for holding and directing the nozzle.

The valve housing, in its entirety designated by the numeral 11, consists of a single piece of metal or plastic material made integral with a straight inlet tube 13, to the screw-threaded end of which an air supplying hose can be connected, and also made integral with a straight outlet tube 15 in line with the first-mentioned tube, and to the end of which there can be attached an outlet nozzle, e.g. of the kind described in the U.S. Pat. No. 3,973,642.

The valve housing is formed with an interior short tube piece or sleeve 17 which is set at right angles to the centre line of the tubes 13, 15 and which has an orifice 19 offset relatively to the cylindrical flow passage of the tubes. The outlet tube 15 communicates with the interior of the sleeve 17, and the space outside of the same communicates with the inlet tube 13. The orifice 19 constitutes an annular valve seat which cooperates in a manner to be described below, with a movable valve body in the shape of a thin flexible diaphragm 21 (FIG. 6). When the diaphragm is applied against the seat, the valve is closed, and when the diaphragm is withdrawn from the seat, the valve is open and pressurized air flows past the edge of the orifice 19.

The greater part of the valve housing is situated laterally of the air passage and is symmetrical about an axis at right angles to the tubes 13, 15. The exterior of the housing is formed by a conical wall 23, the base of which merges into a flat annular face 25. A sleeve 27 with exterior screw threads projects centrally from said face. The inner cavity of the valve housing forms a chamber 29, the cylindrical wall 30 of which is concentric to the sleeve 27 and to the valve seat 19 and of a smaller diameter than the sleeve 27 and a greater diameter than the valve seat 19. The chamber 29 opens into one end of the sleeve 27, and the latter has an outer open end 31.

The diaphragm 21 (FIG. 6) which is made of a flexible and resilient material, such as rubber or plastics, constitutes a body of revolution having a centre part 33 of substantial thickness, a cylindrical peripheral flange 35 and an intermediate annular zone 37 of a reduced thickness. The diaphragm is adapted for insertion into the chamber 29, and its edge flange 35 fits to the cylindrical wall of the chamber and keeps the diaphragm in place. When assembling the valve, the diaphragm can easily be inserted through the wide open end 31 of the sleeve 27 and pushed into che chamber 29 by axial displacement thereof. The diaphragm is loose and it is held at its peripheral edge merely by frictional engagement with the wall 30. Normally the inwardly facing side of the diaphragm is applied against the valve seat 19 (FIG. 9).

After having inserted the diaphragm into its place in the chamber 29, the wide sleeve end 31 is closed by the closure member 39 (shown separately in FIGS. 7 and 8). Said member is fastened to the sleeve 27 by means of screw threads, whereby it can be displaced axially into the desired position. The closure member is accessible from the outside and is particularly designed for being clasped by the fingers, so that it can be turned without the aid of any tools. To this end it is formed with a finger knob 41 which surrounds the sleeve 27 like a cap and the periphery of which is grooved or knurled in order to enable a good grip. Said cap-like portion of the closure member carries interior screw threads engaging exterior screw threads upon the sleeve 27. An obvious modification thereof consists in providing exterior screw threads upon the central portion of the closure member 39 engaging screw threads inside the sleeve 27. In both cases the screw threads are coaxial to and of a greater diameter than the chamber wall 30 and the diaphragm flange 35.

The closure member 39 is formed with a central inward projection 43 which has a circular flat end face of about the same diameter as the valve seat 19 and situated opposite thereto. Said projection constitutes an abutment or support against which the upper side of the centre part 33 of the diaphragm can come to rest (FIG. 10), thus limiting the movement of the diaphragm in the direction away from the valve seat. By manually turning the closure member said projection 43 can be set in a position determining the displacement of the diaphragm and corresponding to the air flow through the valve desired for the occasion.

The diaphragm is displaceable between the positions of FIGS. 9 and 10 by changing the air pressure of the chamber 29. This is accomplished by a push button (separately shown in FIGS. 4 and 5) which switches a valve consisting of a ball 47 inserted in a central passage 49 in the closure member 39. When said valve is closed, the same pressure reigns in the chamber 29 as in the inlet tube 13 on account of the provision of a small hole 51 in the diaphragm which admits pressurized air to the space above the same. On the lower side of the diaphragm the same high pressure reigns merely at the marginal zone, whereas the centre part of the diaphragm is exposed to the low pressure of the outlet tube 15 when the valve is closed. Therefore, the pressure upon the upper side of the diaphragm outbalances the locally reduced pressure on its lower side and the diaphragm is pressed firmly against the valve seat. When the valve should be opened, the push button 45 is depressed, whereby air in the chamber 29 flows past the ball 47 to the atmosphere and the chamber pressure drops so heavily that the pressure upon the lower side of the diaphragm rules and raises the same into abutment with the projection 43 (FIG. 10). The end face of said projection has grooves 53 (FIG. 7) therein which allow a continued flow of air into the passage 49. When the push button is left hold of, the ball 47 is free to move with the air and is pressed tightly against its seat interrupting the flow. Then the pressure of the chamber 29 builds up to full strength again and the diaphragm is returned to its closing position (FIG. 9). The push button is returned to its position of rest by the action of the ball 47.

The push button consists of a disk 55 and a stem 57 (FIGS. 4 and 5). In the stem there is an annular groove 59 adapted to accomodate a snap ring. The stem is guided in a cylindrical recess 61 centrally of the closure member 39 (see FIG. 7) and is retained therein by the snap ring being extended below a shoulder 63. The disk 55 of the push button is partly let into a wider shallow recess 65 in the flat upper side of the closure member. A central pin 67 at the lower end of the stem of the push button enters into the central outlet passage of the closure member and cooperates with the ball 47 therein. In the push button there are grooves 69, 71 through which air can pass past the push button to the open air.

At the peripheral lower edge of the closure member there is a nib 73 (FIG. 8) which has snapped into a half-circular recess 75 (FIGS. 2 and 10) along the edge of the first annular face 25 of the valve housing. Said nib serves to restrict the turning of the closure member to an angle of about 180°.

In use the operator clasps the valve housing and the tube 13 by the hand and lets his thumb rest upon the push button 45. Then it is easy to administer an air blast of the desired duration. If it is desired to vary the strength of the air jet, it is easy for the operator to move the thumb to the knurled edge of the closure member to turn the same, possibly with the aid of the fore finger. Simultaneously and with a continued grip by the other fingers the valve and the tubes are held so firmly that the connected air discharge nozzle (not shown) can be kept directed towards the desired object.

Of course, the above-described embodiment which is merely an example of the application of the invention, can be modified as to its details without departing from the scope of the invention set forth in the following claims. Particularly the term "closure member" should be construed in its widest aspects and is meant to cover caps, lids, sockets, plugs, stoppers, closing covers or analogous members or wall parts which are displaceable relatively to the valve housing by means of screw threads and are easily removable and which, when screwed off, leaves an aperture open through which the diaphragm can pass without distorsion to take its place in the pressure chamber when assembling the valve or to be removed therefrom for replacement when worn out or inoperative.

What I claim is:

1. A valve comprising
   a valve housing,
   a pressure controlled chamber in said housing having a cylindrical wall, and including a valve seat,
   a circular flexible diaphragm in said pressure controlled chamber, and having an integral central portion thereof movable toward and away from said valve seat for controlling fluid flow through the valve,
   means for mounting said diaphragm so that a peripheral rim thereof fits to and is loosely applied against said cylindrical wall of said chamber,
   removable closure means having a greater diameter than said cylindrical wall and attached by screw threads thereto so that upon removal of said closure means unrestricted access is provided to said chamber so that said diaphragm can be readily inserted therein and removed therefrom, and
   stop means formed on said closure member for abutting said central portion of said diaphragm and thus for stopping its motion away from said valve seat so that movement of said diaphragm away from said valve seat is adjustable from outside said housing by rotation of said closure means, said stop means comprising a central inward projection of said closure means.

2. A valve according to claim 1, wherein the diaphragm has a peripheral cylindrical flange which engages the cylindrical wall of the pressure chamber with a frictional fit.

3. A valve according to claim 1, wherein the closure means is coaxial with the valve seat.

4. A valve according to claim 1, wherein the closure member is attached by means of screw threads to a sleeve-like projection upon the valve housing, of a greater internal diameter than and coaxial to the cylindrical wall of the pressure chamber.

5. A valve according to claim 4, wherein the closure member surrounds the sleeve-like projection like a cap and is formed with a peripheral face suitable for turning by hand.

6. A valve according to claim 1, wherein the central inward projection of the closure member has a circular substantially flat face situated opposite to the valve seat and of approximately the valve seat diameter as the same.

7. A valve according to claim 1, wherein the closure member has a central outlet passage through which air in the pressure chamber can be release to the atmosphere, and wherein a manually operable valve is disposed in said passage.

8. A valve according to claim 7, wherein said valve in the outlet passage is operable by a push button located and axially guided in a central recess in the closure member.

9. A valve according to claim 8, wherein the valve in the outlet passage comprises a ball which is displaceable inwardly by means of the push button to open the outlet passage and displaceable outwardly against a seat to close the passage and to return the push button.

10. A valve as recited in claim 2 wherein said diaphragm is made of a material selected from the group consisting essentially of rubber and plastic material, and comprises an annular flexible zone situated between said flange and said central portion, said annular zone being of considerably thinner material than said central portion.

11. A valve comprising
a valve housing,
a chamber within said valve housing, and having a cylindrical wall,
a valve seat within said chamber,
a circular flexible diaphragm disposed in said chamber and having a rim in contact with said cylindrical wall,
means for providing passage of pressurized fluid into and out of said chamber to move said diaphragm toward and away from said seat to control the flow of fluid through said valve,
removable cap means having a greater diameter than said cylindrical wall and attached thereto by screw threads concentric with said cylindrical wall, and
stop means united to said cap means for limiting the movement of said diaphragm away from said seat so that upon rotation of said cap means from exterior of said chamber the amount of movement of said diaphragm away from said valve seat is adjusted.

12. A valve as claimed in claim 11, further comprising a manually operable valve inserted in a central passage in said cap means for venting said chamber.

* * * * *